United States Patent [19]

Sweet et al.

[11] Patent Number: 5,020,316

[45] Date of Patent: Jun. 4, 1991

[54] HELICOPTER CONTROL WITH MULTIPLE SCHEDULE ROTOR SPEED DECAY ANTICIPATOR

[75] Inventors: David H. Sweet, Tequesta; Charles E. Greenberg, Jupiter, both of Fla.; Nicholas D. Lappos, Orange, Conn.; David M. Walsh, Jupiter, Fla.; Richard P. Meisner, Glastonbury, Conn.

[73] Assignee: Coltec Industries Inc., West Hartford, Conn.

[21] Appl. No.: 354,534

[22] Filed: May 19, 1989

[51] Int. Cl.[5] .............................................. F02C 9/28
[52] U.S. Cl. .................................... 60/39.282; 416/30
[58] Field of Search ........... 60/39.161, 39.281, 39.282; 416/25, 27, 30

[56] References Cited

U.S. PATENT DOCUMENTS

| | | | |
|---|---|---|---|
| 2,959,002 | 11/1960 | Best | 416/27 |
| 3,963,372 | 6/1976 | McLain et al. | 416/30 |
| 4,423,593 | 1/1984 | Zagranski et al. | 60/39.281 |
| 4,466,526 | 8/1984 | Howlett et al. | 416/30 |

Primary Examiner—Louis J. Casaregola

[57] ABSTRACT

The speed 54,56 of the free turbine 40 of a helicopter engine 22 is compared 134,138 with the speed 142,140 of the helicopter rotor 10 to indicate 106,108 a specific magnitude of autorotation and the deceleration 150 of the rotor above either one of two threshold magnitudes 220,222 (dependent on the magnitude of autorotation) is utilized 81,68,69 to increase fuel flow 72 to the engine according to a specific schedule 160,162 determined by the type of autorotation, in anticipation of rotor speed droop which would otherwise occur during recovery from the autorotation maneuver.

9 Claims, 1 Drawing Sheet

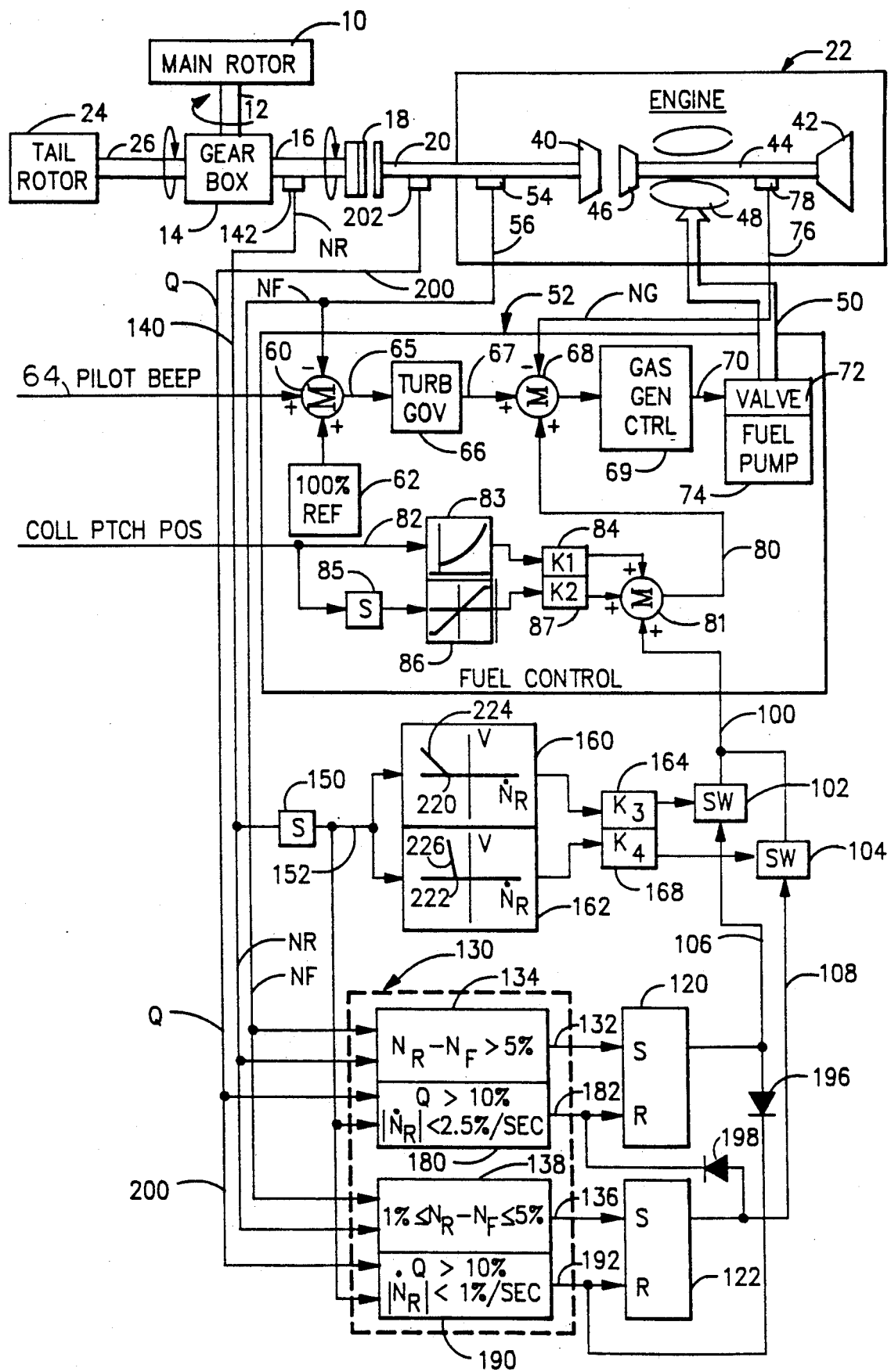

HELICOPTER CONTROL WITH MULTIPLE SCHEDULE ROTOR SPEED DECAY ANTICIPATOR

This invention was made with Government support under a contract awarded by the Department of the Army. The Government has certain rights in this invention.

DESCRIPTION

1. Technical Field

This invention relates to helicopters, and more particularly to means for anticipating decay in main rotor speed during autorotation and for controlling the engine in anticipation of reengagement with the main rotor so as to mitigate engine speed droop.

2. Background Art

The trend toward low inertia main rotor systems in modern helicopters has caused rotors to be more susceptible to large speed excursions during some flight manuevers. During these speed excursions rotor speed exceeds engine speed causing rotor and engine to become decoupled. During this period, (known as autorotation), the engine operates at flight idle The rotor and engine eventually recouple when their speeds are equal, at which time a problem exists because the engine is not adequately prepared for the sudden work load placed on it. Adequate engine performance response is delayed causing rotor speed to droop and the helicopter to exhibit discomforting excursions U.S. Pat. No. 4,466,526 (Howlett et al) discloses a system that addresses this problem. In Howlett et al, rotor speed is compared with engine speed to determine the existence of autorotation, and the deceleration of the rotor above a threshold magnitude is employed to spool up the engine according to a singular gain schedule to increase fuel flow to the engine in anticipation of rotor speed droop at the end of the autorotation maneuver.

The system disclosed in Howlett et al has been found to be inadequate because the singular fuel gain schedule doesn't anticipate different severities of rotor speed droop Different types of autorotation maneuvers result in varying rotor/engine speed differentials. For example, autorotative descents, decelerating turns, rapid approach to landing, and aborted takeoffs cause large rotor/engine speed differentials whereas quick stops, wave offs and quick turns result in smaller splits. It has been found that recovery from autorotation manuevers with larger rotor/engine speed differentials is gradual and therefore requires the engine to be spooled up on a lower gain, more gradual schedule. Alternatively, smaller splits require a more sharp, higher gain schedule. A singular fuel gain schedule attempting to compensate for both situations results in engine overspeeding during the former because the schedule has more gain than is necessary and excessive rotor speed droop during the latter because the schedule has inadequate gain

DISCLOSURE OF THE INVENTION

Objects of the invention include provision of a helicopter engine control which anticipates deceleration of the main rotor and reengagement of the engine therewith at the conclusion of different types of autorotative maneuvers, thereby to minimize engine and main rotor speed droop without overspeeding the engine.

According to the present invention, the speed of a helicopter main rotor is compared with that of the engine to determine the existence of autorotation. The rate of change of speed of the main rotor is subsequently employed in the engine control to spool up the engine according to one of a plurality of schedules in anticipation of reengagement with the main rotor and the substantial torque requirement which normally follows. The particular schedule selected is determined by the differential between rotor and engine speed. In an embodiment of the invention, the gas generator of a free turbine engine is spooled up from flight idle in response to deceleration of the main rotor indicative of the conclusion of an autorotative maneuver.

In further accord with the present invention, detection of a threshold magnitude of engine torque applied to the rotor, or the positive rate of increase in main rotor speed, is utilized to discontinue the engine spooling schedule.

The present invention mitigates the effects of engine and rotor speed droop, including the upset of helicopter attitude trim which may result therefrom.

The invention may be readily implemented in helicopter systems of the type currently known to the art in a simple fashion, in the light of the teachings which follow hereinafter. The invention may be practiced in an analog or digital fashion, employing components and techniques which are well within the skill of the art. The invention may be implemented by means of a simple change in the program of a digital fuel control employing a microprocessor, or by a simple change in the computer of an automatic flight control system (if available); also, the invention may be implemented by the addition of simple analog circuitry or dedicated digital apparatus, as appropriate.

Other objects, features and advantages of the present invention will become more apparent in the light of the following detailed description of exemplary embodiments thereof, as illustrated in the accompanying drawing.

BRIEF DESCRIPTION OF THE DRAWING

The sole Figure herein is a simplified, schematic block diagram of a helicopter rotor drive system in which the engine control is made responsive to an exemplary embodiment of the present invention.

BEST MODE FOR CARRYING OUT THE INVENTION

Referring now to the Figure, a main rotor 10 is connected through a shaft 12 to a gearbox 14 which is driven by a shaft 16 through an over-running clutch 18 which engages an output shaft 20 of an engine 22 when the engine speed equals or exceeds the rotor speed. The gearbox 14 also drives a tail rotor 24 through a shaft 26 so that the main rotor 10 and the tail rotor 24 are always driven at speeds bearing a fixed relationship to each other such as the tail rotor rotating about five times faster than the main rotor.

The engine 22 may typically comprise a free turbine gas engine in which the output shaft 20 is driven by a free turbine 40 which is in turn driven by gases from a gas generator including a turbo compressor having a compressor 42 connected by a shaft 44 to a compressor driving turbine 46 and a burner section 48 to which fuel is applied by fuel lines 50 from a fuel control 52 The fuel control 52 typically tries to provide the correct rate of fuel (WF) in the lines 50 so as to maintain a desired engine speed (NF) as determined by a tachometer 54 which measures the speed of the free turbine 40 (such as on the output shaft 20) to provide a turbine speed indicating signal on a line 56 to a summing junction 60 The other inputs to the summing junction 60 comprise the reference speed which typically is a reference value indicative of 100 percent rated speed derived from a source 62 together with any pilot desired variant therein as determined by a signal from the pilot's engine speed beeper on a line 64. The output of the summing junction 60 is a speed error signal on a line 65 which is applied to a turbine governor portion 66 of the fuel control, the output of which is a required gas generator speed signal on a line 67 which is fed to a summing junction 68 at the input of a gas generator control portion 69 of the fuel control. This provides a commanded fuel rate on a line 70 which is applied to a metering valve 72 so as to cause the correct amount of fuel from a fuel pump 74 to be applied to the fuel inlet lines 50, all in the well known way.

The summing junction 68 is also responsive to a signal indicative of gas generator speed (NG) on a line 76 which may be taken from a tachometer 78 responsive to the gas generator spool including the compressor 42, the shaft 44 and the turbine 46. Another input to the summing junction 68 is a line 80 from a summing junction 81 which provides a collective pitch input to the system. A signal on the line 82 indicative of collective pitch position (which may be a signal indicative of an angle of a collective pitch stick representative of a given percent of full collective pitch authority) is provided through both proportional and derivative paths. The proportional path includes a function generator or schedule circuit 83 together with an amplifier 84 having a gain K1. The derivative path includes a differentiator 85, a limiter 86 and an amplifier 87 having a gain K2. The outputs of the amplifiers 84, 87 are applied to the summing junction 81. As collective pitch is changed, the derivative path 85–87 provides inputs to increase or decrease the normal turbine governor demand on the gas generator immediately. Similarly, for collective pitch in excess of a predetermined threshold magnitude, the proportional path 83, 84 will provide steady state inputs to the fuel control. This is the type of collective pitch control over the engine which is described briefly hereinbefore.

All of apparatus described thus far is simply exemplary of that known to the art.

In accordance with the present invention, an additional input is provided to the summing junction 81 on a signal line 100 which is indicative of a rotor deceleration rate during autorotation. Autorotation is defined herein as whenever rotor speed is greater than free turbine speed. The signal on the line 100 is provided through either of a pair of switches 102, 104 only when there is a signal on one of the appropriate lines 106, 108. The signals on lines 106, 108 are provided by a pair of bistable devices 120, 122 which are controlled by comparators 130. Bistable device 120 is set by a signal on a line 132 at the output of comparator 134 whenever the rotor speed (NR) is greater than the free turbine speed (NF) by more than 5 percent of rated turbine speed. Bistable device 122 is set by a signal on line 136 at the output of comparator 138 whenever rotor speed (NR) is greater than free turbine speed (NF) and the difference between rotor speed and free turbine speed is greater than or equal to 1 percent but less than or equal to 5 percent of rated turbine speed. Comparators 134, 138 are responsive to the free turbine speed signal provided by the tachometer 54 on a line 56 and a main rotor speed signal on a line 140 which is provided by the tachometer 142, which may be responsive to the speed of the shaft 16 at the input to the gearbox 14, as shown, or it may be made responsive to the main rotor shaft 12 or any other easily accessible shaft on the drive train, related to the rotor side of the clutch, so long as the gear ratio and gain of the system are properly adjusted. The rotor speed signal on the line 140 is applied to a differentiator 150 so as to provide a signal indicative of the rate of change of rotor speed, or rotor acceleration, on a line 152, which in turn is applied to a pair of function generators or schedules 160, 162 that provide an output only for rotor decelerations in excess of predetermined magnitudes The threshold magnitude for schedule 160 is represented by intercept point 220 and equals 3 percent per second rate of deceleration. The threshold magnitude for schedule 162 is represented by intercept point 222 and equals 1.5 percent per second rate of deceleration. Schedules 160,162 are represented by the straight lines 224,226 which in turn represent that the gain of the schedules is constant (i.e. the magnitude of signal on line 100 added to summing junction 81 is linear with respect to the rotor deceleration signal on line 152) and equal to the slope of lines 224,226. The output of schedule 160 is applied through an amplifier 164 having a gain K3 and the switch 102 over the line 100 to the summing junction 81. The output of the schedule 162 is applied through an amplifier 168 having a gain K4 and the switch 104 over the line 100 to the summing junction 81. Each switch 102, 104 may comprise an F.E.T. or other transistor switch as is known in the art.

Bistable device 120 remains set until: a) comparator 180 provides a reset signal on line 182 indicating that rotor acceleration is nearly zero (e.g. about 2.5 percent rated speed per second) and the torque applied to the rotor is greater than 10 percent of rated torque; or b) a signal on line 108 indicates bistable device 122 has been set. Bistable device 122 remains set until: a) comparator 190 provides a reset signal on line 192 indicating that rotor acceleration is nearly zero (e.g. about 1 percent rated speed per second) and the torque applied to the rotor is greater than 10 percent; or b) a signal on line 106 indicates bistable device 120 has been set. Bistable devices 120,122 are set dominant. Diodes 196,198 prevent the signals on lines 192,182 from setting switches 102,104 respectively. Comparators 180, 190 are responsive to the rate of change of rotor speed on line 152 and a torque (Q) signal on line 200 provided by a torque indicator 202 which may be a helical gear or any other torque transducer as is well know in the art. The comparators 180,190 may each be implemented using two comparators, one for rotor acceleration and one for torque, both feeding an AND circuit, which does the resetting.

Whenever an autorotation maneuver is executed wherein the rotor speed exceeds the free turbine speed between 1 percent and 5 percent, switch 104 will be enabled and switch 102 will be disabled, but the input thereto is initially zero. At the conclusion of the maneuver, as the main rotor 10 spools down in response to load demand, the deceleration rate, once it exceeds a threshold magnitude defined by intersect point 222, will cause an input to summing junction 81 as defined by schedule 162, which in turn provides an additional input to the summing junction 68.

Alternatively, if the rotor speed exceeded the free turbine speed by more than 5 percent during the maneuver, switch 102 will be enabled and switch 104 will be disabled. The input at switch 102 will initially be zero. At the conclusion of the maneuver, as the main rotor 10 spools down, the deceleration rate, once it exceeds a threshold magnitude defined by schedule 160 at intersect point 220, will cause an input to the summing junction 81 according to the schedule 160, thereby to cause the gas generator schedule to be increased providing more fuel to the engine so that the gas generator will spool up in anticipation of the required torque loading which will occur when the main rotor reengages with the engine.

Schedules 160,162 represent two different schedules for increasing fuel flow during recovery from autorotation maneuvers having different maximum rotor/engine speed differentials. The gain of schedule 160 is of lower magnitude than that of schedule 162 because recovery from autorotation maneuvers having rotor/engine speed differentials greater than 5 percent does not require the engine to be spooled up as quickly as maneuvers with differentials less than 5 percent. Although two schedules are represented in the figure, the number of them is certainly not restricted to two. Many different schedules, or a continuous schedule with variable gain, dependent on a variety of conditions could very well be incorporated as needed. Instead of alternative schedules, increments from two or more schedules could be added together (rather than selected by switches) so as to permit a wide variation in the overall result.

Torque signal 200 is used by comparators 180,190 to terminate schedules 160,162 to ensure the engine is providing power to the rotor and engine spooling is not, therefore, terminated prematurely. Also, torque could very well be used as a condition for reset in a system utilizing the singular schedule known in the prior art.

Although not shown, the speed, torque, and collective input signals are preferably filtered in a suitable known way and the derivative circuit 150 may have a low pass filter to reduce noise associated therewith.

Although the invention is shown as being an add on to an existing fuel control, it of course may be incorporated directly within the fuel control. Although shown in terms of analog function blocks, the invention may be implemented very easily with a simple computer program change made to the program of a fuel control which is implemented digitally by means of a computer or it may be incorporated as a simple program change within a digital, computerized automatic flight control system, if desired. In fact, the invention has only been implemented as software algorithms such as those disclosed in U.S. Pat. Nos. 4,270,168 and 4,564,908. The invention could be implemented with dedicated digital or analog hardware. The equivalence between analog, dedicated digital and software is illustrated (in a different context) in U.S. Pat. No. 4,294,162. The invention is described as it may be utilized with the fuel control of a free turbine gas engine. However, it may also be utilized with other types of engines in an appropriate fashion which should be readily apparent to those skilled in the art in the light of the description hereinbefore. All of the foregoing changes and variations are irrelevant to the invention, it suffice that the helicopter main rotor driving engine be appropriately controlled in response to main rotor deceleration during autorotation so as to appropriately anticipate, without engine overshoot, the torque load which will be imparted thereto as the main rotor re-engages with the engine.

Thus, although the invention has been shown and described with respect to exemplary embodiments thereof, it should be understood by those skilled in the art that the foregoing and various other changes, omissions and additions may be made therein and thereto without departing from the spirit and the scope of the invention.

I claim:

1. A helicopter comprising:

a rotor;

an engine;

rotor drive means including an overruning clutch for connecting said rotor to said engine whenever the speed of said rotor does not exceed the speed of said engine;

engine speed means for providing an engine speed signal indicative of the rotary speed of said engine;

rotor speed means for providing a rotor speed signal indicative of the rotory speed of said rotor;

rotor acceleration means for providing a rotor acceleration signal indicative of the positive or negative acceleration of said rotor;

engine control means for providing a fuel command signal indicative of fuel flow required for desired engine operation, and for metering fuel flow to said engine in response to said fuel command signal;

characterized by said engine control means comprising means for:

a) detecting the magnitude of difference between said rotor speed signal and said engine speed signal and providing a difference signal indicative thereof; and b) providing said fuel command signal with a selected one of a plurality of fuel increase-indicating components which are different, corresponding functions of the magnitude of said rotor acceleration signal, in dependence on the magnitude of said difference signal.

2. A helicopter according to claim 1, further characterized by said engine control means comprising means for providing a first increase-indicating component as a first function of said acceleration signal in response to said difference signal being between a pair of predetermined reference values, and for providing a second increase-indicating component, which is a lesser function of said acceleration signal than said first increase-indicating component in response to said difference signal being above a threshold magnitude in excess of both of said pair of values.

3. The helicopter according to claim 2, further comprising torque sensing means responsive to said rotor for providing a torque signal indicative thereof, and wherein said selected fuel increase-indicating component is provided until said torque signal exceeds a predetermined threshold magnitude.

4. The helicopter according to claim 2, wherein said selected fuel increase-indicating component is provided until said rotor acceleration signal is less than a predetermined cut-off magnitude.

5. The helicopter according to claim 2, further comprising said engine control means comprising means for providing said increase-indicating component as said first function of said acceleration signal above a first deceleration threshold magnitude, and for providing said increase-indicating component as said second function of said acceleration signal above a second acceleration threshold magnitude greater than said first acceleration threshold magnitude.

6. The helicopter according to claim 1, further comprising torque sensing means responsive to said rotor for providing a torque signal indicative thereof, and wherein said selected fuel increase-indicating component is provided until said torque signal exceeds a predetermined threshold magnitude.

7. The helicopter according to claim 6, wherein said selected fuel increase-indicating component is provided until said rotor acceleration signal is less than a predetermined cut-off magnitude and said torque signal exceeds said predetermined threshold magnitude.

8. The helicopter according to claim 1, wherein said selected fuel increase-indicating component is provided until said rotor acceleration signal is less than a predetermined cut-off magnitude.

9. A helicopter comprising:
a rotor;
an engine;
rotor drive means including an overruning clutch for connecting said rotor to said engine whenever the speed of said rotor does not exceed the speed of said engine;
engine speed means for providing an engine speed signal indicative of the rotary speed of said engine;
rotor speed means for providing a rotor speed signal indicative of the rotory speed of said rotor;
rotor acceleration means for providing a rotor acceleration signal indicative of the positive or negative acceleration of said rotor;
engine control means for: a) providing a fuel command signal indicative of fuel flow required for desired engine operation, and for metering fuel flow to said engine in response to said fuel command signal; b) detecting a magnitude difference between said rotor speed signal and said engine speed signal and providing a difference signal indicative thereof; c) providing said fuel command signal with a fuel increase-indicating component in response to said rotor acceleration signal in the presence of said difference signal;
characterized by:
torque means for providing a torque signal indicative of the amount of torque said engine imparts to said rotor; and
said engine control means comprising means for continuing said fuel increase-indicating component until said torque signal exceeds a predetermined threshold magnitude.

* * * * *